United States Patent
Ben-Haim et al.

(10) Patent No.: US 9,342,826 B2
(45) Date of Patent: *May 17, 2016

(54) SYSTEM, APPARATUS, AND METHOD FOR UTILIZING A READING OF A MACHINE READABLE ELEMENT ASSOCIATED WITH A CONSUMABLE PRODUCT

(71) Applicant: GOJI LIMITED, Hamilton (BM)

(72) Inventors: Shlomo Ben-Haim, London (GB); Keith Pascal, Highland Park, IL (US)

(73) Assignee: GOJI LIMITED, Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/817,360

(22) Filed: Aug. 4, 2015

(65) Prior Publication Data

US 2015/0339653 A1    Nov. 26, 2015

Related U.S. Application Data

(63) Continuation of application No. 13/655,822, filed on Oct. 19, 2012, now Pat. No. 9,129,229.

(60) Provisional application No. 61/549,356, filed on Oct. 20, 2011, provisional application No. 61/661,512, filed on Jun. 19, 2012.

(51) Int. Cl.
G06Q 20/24    (2012.01)
G06Q 20/26    (2012.01)
(Continued)

(52) U.S. Cl.
CPC ............... *G06Q 20/24* (2013.01); *G06Q 10/00* (2013.01); *G06Q 20/26* (2013.01); *G06Q 20/3278* (2013.01); *G06Q 30/0222* (2013.01)

(58) Field of Classification Search
CPC .............. G06F 17/30; G06F 17/30725; G06F 17/30879
USPC .......................... 235/375, 383, 385
See application file for complete search history.

(56) References Cited

U.S. PATENT DOCUMENTS 6,953,919 B2    10/2005    Clothier
2008/0197980 A1    8/2008    Howarth et al.
(Continued)

FOREIGN PATENT DOCUMENTS

GB    2 457 999 A    9/2009

OTHER PUBLICATIONS

Thiesse et al., "An Analysis of Usage-Based Pricing Policies for Smart Products," Electronic Markets, vol. 18, issue 3, Aug. 2008, 12 pages.

(Continued)

*Primary Examiner* — Allyson Trail
(74) *Attorney, Agent, or Firm* — Finnegan, Henderson, Farabow, Garrett & Dunner LLP

(57) ABSTRACT

A method for utilizing a reading of a machine readable element associated with a consumable product, may include storing, by a computer, in a memory in communication with the computer, a record of apparatus identification information associated with an apparatus having a reader for reading the machine readable element. The method may also include obtaining usage information based on a reading of the machine readable element by the reader, wherein the usage information comprises identity information indicative of an identity of a supplier of the consumable product and applying, by the computer, a debit to the supplier of the consumable product based on the usage information and the apparatus identification information.

12 Claims, 6 Drawing Sheets

(51) Int. Cl.
*G06Q 20/32* (2012.01)
*G06Q 30/02* (2012.01)
*G06Q 10/00* (2012.01)

(56) References Cited

U.S. PATENT DOCUMENTS

2009/0008447 A1 1/2009 Godlewski
2013/0214044 A1 8/2013 Sperduti et al.

OTHER PUBLICATIONS

Uckelmann et al., "9 Integrated Billing Solutions in the Internet of Things," Architecting the Internet of Things, Springer-Verlag Berlin Heidelberg 2011, pp. 229-251.
Uckelmann et al., "Performance Increase and Benefit Compensation in Supply Chains by Partial Information Sharing and Billing Based on Identification of Returnable Transport Items," International Journal of RF Technologies: Research and Applications, vol. 1, No. 1, Mar. 2009, pp. 23-43.
Bowman, et al., "Reusable Asset Management Model," BRIDGE—Building Radio Frequency Identification for the Global Environment, Jun. 2009, 53 pages.
Chen et al., "A Smart Kitchen to Promote Healthy Cooking," National Taiwan University, UbiComp 2006, 2 pages.
Gu, et al., "A Content-aware Fridge Based on RFID in Smart Home for Home-Healthcare," ISBN 978-89-5519-139-4, Feb. 15-18, 2009 ICACT 2009, 4 pages.
Murakami et al., "Cooking Procedure Recognition and Support by Ubiquitous Sensors," Journal of Robotics and Mechatronics, vol. 21, No. 4, 2009, pp. 498-506.
Nakauchi, et al., "Cooking Procedure Recognition and Support System by Intelligent Environments," IEEE 2009, 8 pages.
Shieh et al., "RFID Restaurant POS System," Proceedings of the 2011 International Conference on Machine Learning and Cybernetics, Guilln, Jul. 2011, 4 pages.
Huff, Karleigh, "Active and Intelligent Packaging: Innovations for the Future," 2008, 13 pages.
Swedberg, Claire, "Industrial Meat Ovens Cook with RFID," RFID Journal, http://www.rfidjournal.com/article/view/8472, May 27, 2011, 3 pages.
Li, et al., "Intelligent Oven in Smart Home Environment," 2009 International Conference on Research Challenges in Computer Science, IEEE Computer Society 2009, 4 pages.
Anonymous, "Oven Ready?" Caterer & Hotelkeeper; Jan. 31-Feb. 6, 2008; 198, 4512; ABI/INFORM Trade & Industry, 3 pages.
Schneider, "The Semantic Cookbook: Sharing Cooking Experiences in the Smart Kitchen," Intelligent Environments, Sep. 2007, 10 pages.
Luo et al., "Smart Fridges with Multimedia Capability for Better Nutrition and Health," 2008 International Symposium on Ubiquitous Multimedia Computing, 2008 IEEE Computer Society, 6 pages.
Russo, et al., "SmartWave-Intelligent Meal Preparation System to Help Older People Live Independently," ICOST 2004, 14 pages.
Helal et al., "The Gator Tech Smart House: A Programmable Pervasive Space," IEEE Computer Society, Mar. 2005, 11 pages.
Whitehall, Bruce, "What's Hot in the Kitchen," Caterer & Hotelkeeper; Jun. 15-Jun. 21, 2006; 196, 4429; ABI/INFORM Trade & Industry, 2 pages.

SYSTEM, APPARATUS, AND METHOD FOR UTILIZING A READING OF A MACHINE READABLE ELEMENT ASSOCIATED WITH A CONSUMABLE PRODUCT

RELATED APPLICATIONS

The present application is a continuation of U.S. patent application Ser. No. 13/655,822, filed Oct. 19, 2012, which claims the benefit of priority to U.S. Provisional Patent Application No. 61/549,356, filed on Oct. 20, 2011, and U.S. Provisional Patent Application No. 61/661,512, filed on Jun. 19, 2012. Each of these applications is fully incorporated herein by reference in its entirety.

TECHNICAL FIELD

The present invention relates to systems, apparatuses, and methods for utilizing readings of machine readable elements associated with consumable products.

BACKGROUND

In industries involving the supply and sale of consumable products, such as the food industry, participating entities in the supply and consumption chain may include consumable product suppliers/manufacturers, consumable product retailers, and manufacturers of apparatuses for processing consumable products. In the food industry example, these entities may include food suppliers/manufactures that provide food products for selling to food retailers; food retailers, such as restaurants, hotels, etc., that purchase food products from food suppliers and process (e.g., cook) them using cooking devices (e.g., ovens) for serving food to consumers; and cooking device manufactures that make and sell cooking devices to food retailers for processing food products. Traditionally, food retailers purchase food products from food suppliers and purchase cooking devices from device manufactures, and these two purchases are generally separate businesses. Consumable products retailers may be offered incentives based on quantities of articles purchased from consumable products suppliers.

SUMMARY

Some disclosed embodiments may include a method for utilizing a reading of a machine readable element associated with a consumable product. The method may comprise storing, by a computer, in a memory in communication with the computer, a record of apparatus identification information associated with an apparatus having a reader for reading the machine readable element. The method may also comprise obtaining usage information based on a reading of the machine readable element by the reader, wherein the usage information comprises identity information indicative of an identity of a supplier of the consumable product. The method may further comprise applying, by the computer, a debit to the supplier of the consumable product based on the usage information and the apparatus identification information.

Some disclosed embodiments may include an apparatus for processing a consumable product associated with a machine readable element. The apparatus may include a reader configured to read the machine readable element, a communication interface configured to exchange information with a computer, and a controller. The controller may be configured to receive, from the reader, information associated with the consumable product based on a reading of the machine readable element by the reader. The controller may also be configured to determine usage information for the consumable product based on the information received from the reader, the usage information including an identity of a supplier of the consumable product. The controller may be further configured to control the communication interface to send the identity of the supplier of the consumable product to the computer, such that the computer can apply a debit to the supplier of the consumable product.

Some disclosed embodiments may include a method for utilizing information read from a machine readable element associated with a consumable product. The method may comprise obtaining identity information of a supplier of the consumable product by reading information associated with the machine readable element, and determining usage information associated with the consumable product based on the identity information. The method may also comprise sending the usage information and the identity information of the supplier of the consumable product to a computer, such that the computer can apply a debit to the supplier of the consumable product based on the usage information.

The preceding summary is not intended to restrict in any way the scope of the claimed invention. In addition, it is to be understood that both the foregoing general description and the following detailed description are exemplary and explanatory only and are not restrictive of the invention, as claimed.

BRIEF DESCRIPTION OF THE DRAWING

The accompanying drawings, which are incorporated in and constitute a part of this specification, illustrate various embodiments and exemplary aspects of the present invention and, together with the description, explain principles of the invention. In the drawings.

DESCRIPTION OF EXEMPLARY EMBODIMENT

Reference will now be made in detail to exemplary embodiments of the invention, examples of which are represented in the accompanying drawings. When appropriate, the same reference numbers are used throughout the drawings to refer to the same or like parts.

Embodiments of the invention may involve apparatuses for processing consumable products. The apparatuses may include any apparatus configured to process (e.g., cook, thaw, heat, etc.) a consumable product placed in the apparatus (e.g., an energy application zone of the apparatus) by applying energy (e.g., thermal energy and/or electromagnetic energy, for example in the RE frequency range) to the consumable product. A consumable product may be considered as processed if at least one property in at least a portion of the consumable product has changed due to energy application. For example, the apparatus may be a cooking oven that cooks consumable products, e.g., food items, by, for example, applying electromagnetic radiation (e.g., in the RF frequency range) to the food items. If the electromagnetic radiation is RF radiation, such a process may also be referred to as an RF cooking process, and the cooking oven may be called an RF oven. A food item may be considered cooked in a food processing apparatus if at least a portion of the food item (e.g., at least one food ingredient and/or food component) has been: thawed, cooked, baked, browned, warmed, roasted, etc., by applying energy (e.g., RF energy, hot air etc.).

The term consumable product may refer to any item that includes at least a portion thereof that can be processed by energy application. Reference to a consumable product (also referred to as a consumable, object, or load) is not limited to a particular form. A consumable product may include a liquid, solid, or gas, depending upon the particular process with which one or more embodiments of the invention are utilized, and the consumable product may include composites or mixtures of matter in one or more differing phases. Further, although the term consumable product is in the singular, it may refer to multiple items or detached parts or components. Consumable products may be products that consumers buy recurrently, e.g., items which get used up or discarded. Thus, by way of a non-limiting example, the term consumable product may encompass such matter as food to be cooked; frozen material to be thawed (e.g., frozen meals); liquids to be heated, boiled, or vaporized; or any other material for which there is a desire to process (e.g., by applying energy).

Figure 1:
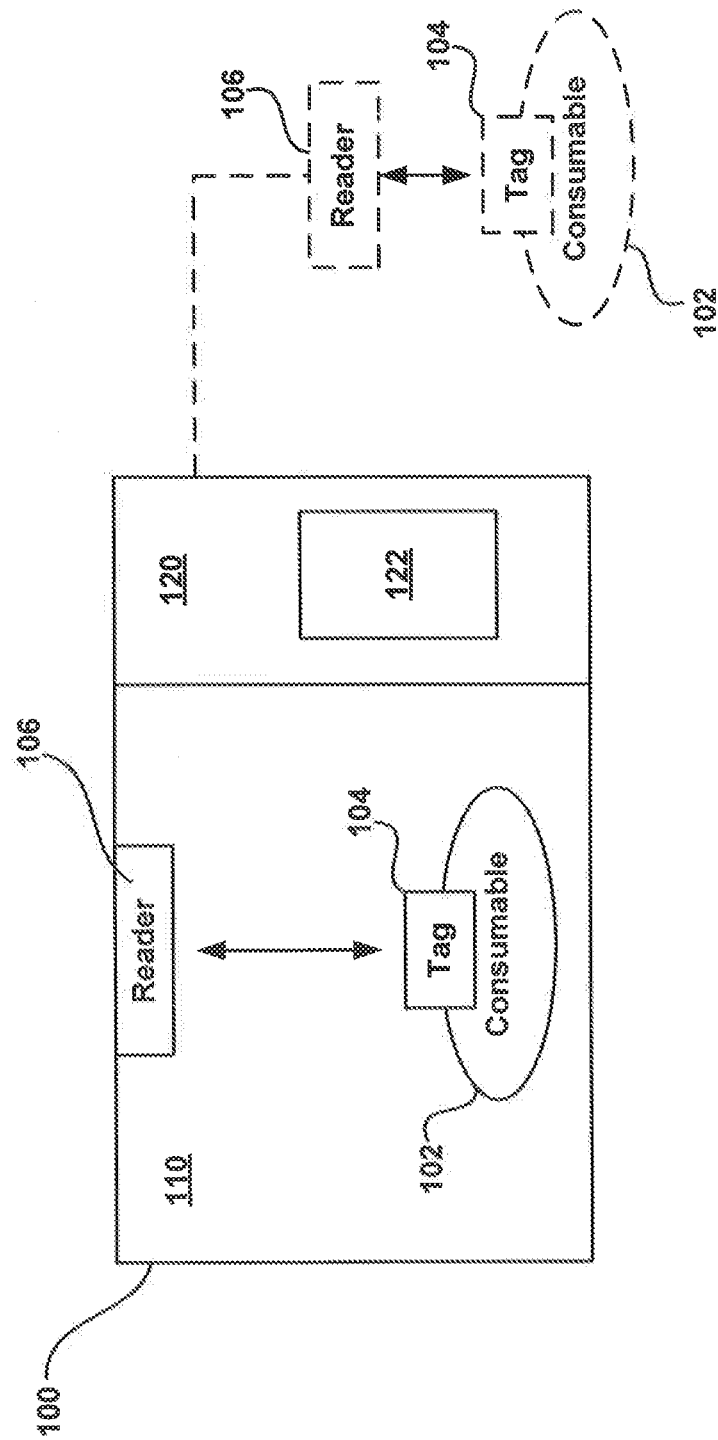
FIG. 1 is a diagrammatic representation of an apparatus for processing a consumable product, in accordance with some disclosed embodiments.

FIG. 1 illustrates an exemplary apparatus 100 for processing a consumable product 102. In some embodiments, apparatus 100 may include an RF oven, such as an electromagnetic energy processing apparatus that applies electromagnetic, energy in the RF frequency range to process (e.g., cook) an object placed in the apparatus. Consumable product 102 may include a food product including packaging (not shown) and one or more food components (not shown). As used herein, the term food component refers generally to any part or entirety of a food product, including but not limited to: a part or entirety of a food product that includes a mixture of several different kinds of food ingredients. For example, a food component may include a meat ball made of meat, vegetables, and spices.

In some embodiments, consumable product 102 may include (or may be associated with) a machine readable element, e.g., a tag 104. Tag 104 may be embedded into or associated with the packaging or the one or more food components of consumable product 102. Tag 104 may include information regarding consumable product 102, e.g., an identification of consumable product 102. In some embodiments, tag 104 of consumable product 102 may include a bar code or other graphical identifier. In some embodiments, tag 104 of consumable product 102 may be implemented using a resonant circuit having a specific frequency that identifies consumable product 102. In some embodiments, identification information may be stored on tag 104, in other embodiments, identification information may be inferred from information stored on tag 104. Information included on tag 104 may be obtained through a reader 106 to process (e.g., cook, thaw, heat, etc.) consumable product 102 using apparatus 100. The machine readable element (e.g., tag 104) may be configured to be read using AIDC (Automatic Identification and Data Capture) technology and may be referred to as an AIDC, element. AIDC refers to methods that may include automatically identifying objects, collecting data about them, and entering that data directly into computer systems. Technologies that may be consistent with AIDC include bar codes, Radio Frequency identification (RFID), magnetic stripes, Optical Character Recognition (OCR), and smart cards. AIDC may also be referred to as "Automatic Identification," "Auto-ID," and "Automatic Data Capture." Reader 106 may include, for example, a printed code reader (e.g., a barcode reader, a matrix code reader, etc.), an RFID reader, a magnetic stripe reader, a smart card reader, an optical reader (e.g., a camera), or a combination of such technologies. In some embodiments, apparatus 100 may include one or more devices to implement AIDC technology. For example, reader 106 may include one or more reading elements according to different technologies. Alternatively or additionally, apparatus 100 may include one or more readers.

Apparatus 100 may include an energy application zone 110. As used herein, an energy application zone may include any void, location, region, or area where energy may be applied. It may include a hollow, or may be filled or partially filled with liquids, solids, gases, or combinations thereof. By way of example, an energy application zone may include the interior of an enclosure, interior of a partial enclosure, interior of a conduit, open space, solid, or partial solid. The zone may be permanent or may be temporarily constituted for purposes of energy application. For ease of discussion, all such alternative energy application zones may alternatively be referred to as cavities, with the understanding that the term cavity implies no particular physical structure other than an area in which the consumable product may be processed.

Referring back to FIG. 1, consumable product 102 may be processed by apparatus 100, e.g., using RF energy, in energy application zone 110. In some embodiments, apparatus 100 may include an energy application element (not shown), e.g., an RF source, an amplifier, a modulator, an antenna, or a combination thereof, to provide RF energy for processing consumable product 102. In some embodiments, reader 106 may be configured in a way that when consumable product 102 is placed in energy application zone 110, reader 106 can read the information contained in tag 104. For example, reader 106 may be placed inside, or partially inside energy application zone 110, such that an information transfer channel may be established between reader 106 and tag 104 when tag 104 is also placed in energy application zone 110. In some embodiments, reader 106 may be located completely outside energy application zone 110, but an information transfer channel between reader 106 and tag 104 may still be established when tag 104 is in energy application zone 110. For example, in some embodiments, an information transfer channel between reader 106 and tag 104 may include a window between reader 106 and energy application zone 110. Reader 106 may read information from tag 104 using magnetic or RF field, and the window may be made of materials having relatively low electric or magnetic conductivity, such as plastic, rubber, glass, etc. Reader 106 may also be configured to read information from tag 104 using optical waves, and the window may be made of materials that are transparent to optical waves, such as glass, clear plastic, etc.

In some embodiments, reader 106 may be configured to read information from tag 104 from outside energy application zone 110. For example, reader 106 may include a portable device in communication with apparatus 100 using wired or wireless technology. In such a case, consumable product 102 may be placed in the proximity of reader 106 to read information from tag 104 before and/or after the consumable product is processed by apparatus 100, as illustrated by dashed lines in FIG. 1. By way of example only, reader 106 may be connected to apparatus 100 through a cable (e.g., USB, IEEE 1394, Ethernet, Serial, Parallel, Thunderbolt, etc.), or through a wireless connection, such as Wi-Fi, Bluetooth, Near Field Communication (NFC), etc.

Apparatus 100 may include an interface 120. Interface 120 may include a control panel 122 for receiving input from a user. In some embodiments, the input received via control panel 122 may be used to control or operate at least one function of apparatus 100. Control panel 122 may include a key pad, a touch screen, a display, buttons, knobs, dials, etc. Interface 120 may also include communication interface for connecting apparatus 100 to, for example, reader 106, external portal storage, network, etc.

Figure 2:
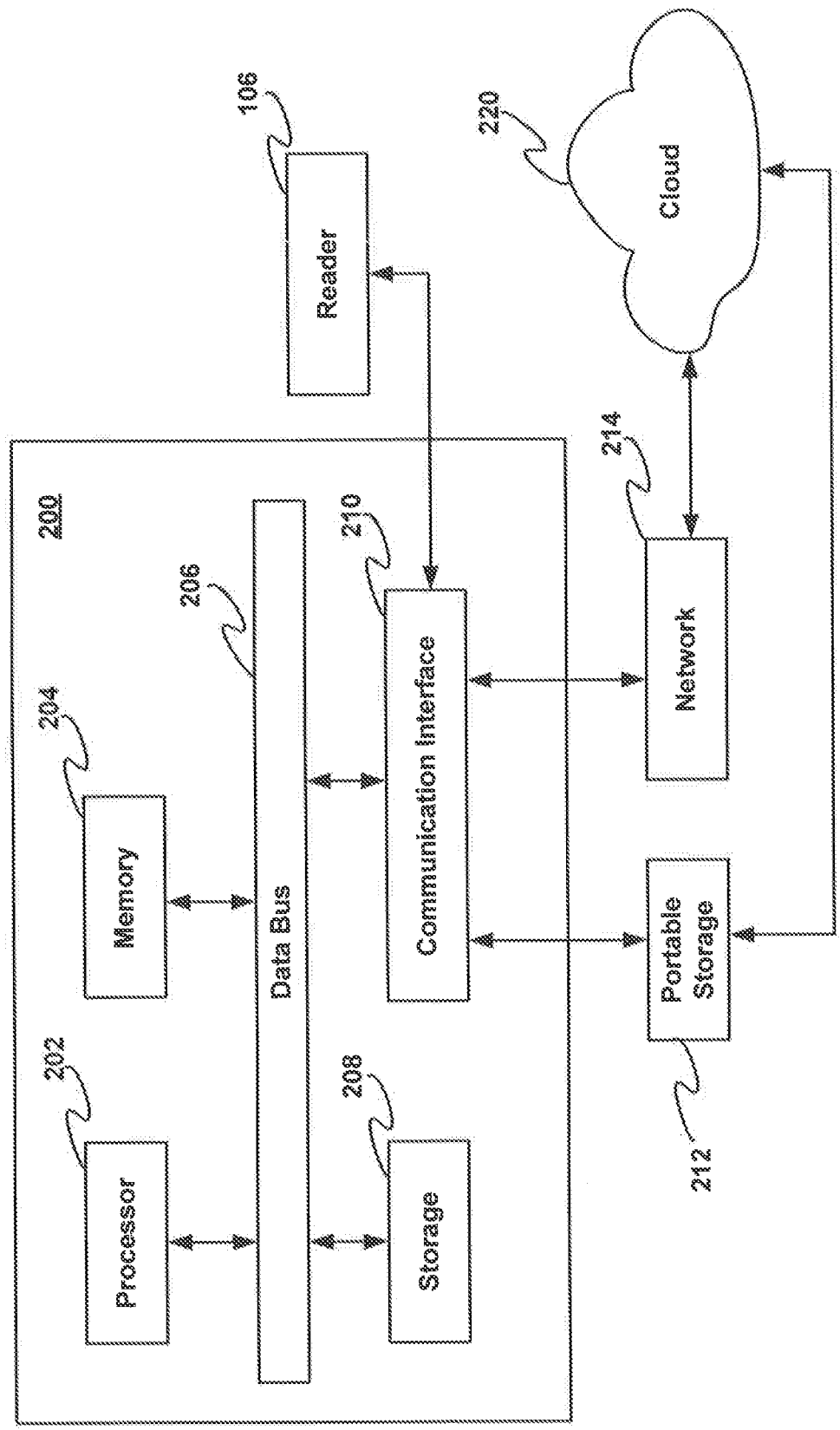
FIG. 2 is a diagrammatic representation of a controller of the apparatus shown in FIG. 1, in accordance with some disclosed embodiments.

FIG. 2 provides a diagrammatic representation of a controller 200 of apparatus 100, in accordance with some disclosed embodiments. Controller 200 may include a processor 202, a memory 204, a data bus 206, storage 208, and a communication interface 210. It is noted that controller 200 may include less components than illustrated in FIG. 2 (e.g., controller 200 may constitute only a processor 202 in some embodiments). Alternatively, controller 200 may include more components than illustrated in FIG. 2 (e.g., controller 200 may also include input/output components). Also, controller 200 may include components different from those illustrated, regardless of the total number of the components.

Processor 202 may include any type of electric circuit configured to execute one or more instructions. For example, such a processor may include one or more integrated circuits, microchips, microcontrollers, microprocessors, all or part of a central processing unit (CPU), graphics processing unit (GPU), digital signal processors (DSP), field-programmable gate array (FPGA) or other circuit suitable for executing instructions or performing logic operations.

The instructions executed by processor 202 may, for example, be pre-loaded into the processor or may be stored in a separate unit such as memory 204 (e.g., a RAM, a ROM, or other permanent, fixed, or volatile memory) and/or storage 208 (e.g., a hard disk, an optical disk, a magnetic medium, a flash memory), or any other mechanism capable of providing instructions to processor 202. Processor 202 may be customized for a particular use, or can be configured for general-purpose use. Processor 202 may perform different functions by executing different software.

If more than one processor is employed, all may be of similar construction, or they may be of differing constructions electrically connected or independent from one another. They may be separate circuits or integrated in a single circuit. When more than one processor is used, they may be configured to operate independently or collaboratively. They may be coupled electrically, magnetically, optically, acoustically, mechanically, wirelessly or in any other way permitting at least one signal to be communicated between them.

Processor 202, memory 204, storage 208, and communication interface 210 may exchange information through data bus 206. For example, information obtained by reader 106 from tag 104 may be transferred via communication interface 210 and then through data bus 206 to processor 202 for processing. Processor 202 may analyze the information and control apparatus 100 to process consumable product 102 based on the information. In some embodiments, at least a portion of the information, processed information, and/or new information derived therefrom may be saved in memory 204 and/or storage 208. In some embodiments, such information may be sent to a portable storage 212 and/or a network 214 via communication interface 210.

In some embodiments, portable storage 212 may include hard drives, optical disks, flash drives, memory cards (e.g., SD cards), etc. Network 214 may include Wi-Fi (e.g., IEEE 802.11 a/b/g/n), Bluetooth, telecommunication network components (e.g., GSM, CDMA, GPRS, EDGE, 3G, 4G, LTE, WiMAX, etc.), LAN, WAN, Ethernet, fiber optical network, VPN, etc. Communication interface 210 may include USB interface, IEEE 1394 interface, optical drives, memory card drives, Serial ATA interface, Ethernet interface, Thunderbolt interface, Wi-Fi interface, Bluetooth interface, telecommunication interface, or fiber optical interface, etc.

It is noted that the term apparatus may include any component or group of components described herein. For example, an apparatus may refer only to a controller (e.g., controller 200) or a processor (e.g., processor 202) as illustrated in FIG. 2. Alternatively, an apparatus may include a combination of a processor (e.g., 202) and one or more other components of controller 200; a controller (e.g., 200), an energy application zone (e.g., 110), and one or more readers (e.g., 106); or any other combination of components described herein.

Controller 200 may be configured to communicate with any suitable remotely located systems or components via, e.g., the Internet. In some embodiments, controller 200 may exchange information with a cloud 220. As used herein, a cloud may include any set of computing devices that deliver computing as a service over a network (e.g., Internet) and any entities involved in building, managing, maintaining, operating, providing, promoting, marketing, and implementing any hardware and/or software related to the computing devices, network, and/or the delivered service. For example, cloud 220 may comprise one or more communicatively connected computers that receive data and deliver computing results based on the data through Internet. Cloud 220 may include a centralized system, e.g., a system based on one or a few major computing centers, or a distributed system, e.g., a system comprising multiple peer computing sites that are geographically and/or logically distributed. Information exchange between apparatus 100 (e.g., controlled by controller 200) and cloud 220 may be implemented using portable storage 212 and/or network 214. For example, information may be downloaded from apparatus 100 to portable storage 212 periodically (e.g., in batch) and uploaded to cloud 220 using any device capable of accessing cloud 220. In another example, information may be downloaded from apparatus 100 and transferred to cloud 220 directly through network 214. In this case, the downloading and transferring can be either in batch mode or in real time. On the other hand, information may also be transferred from cloud 220 to apparatus 100 in a similar manner but in reverse direction.

Figure 3:
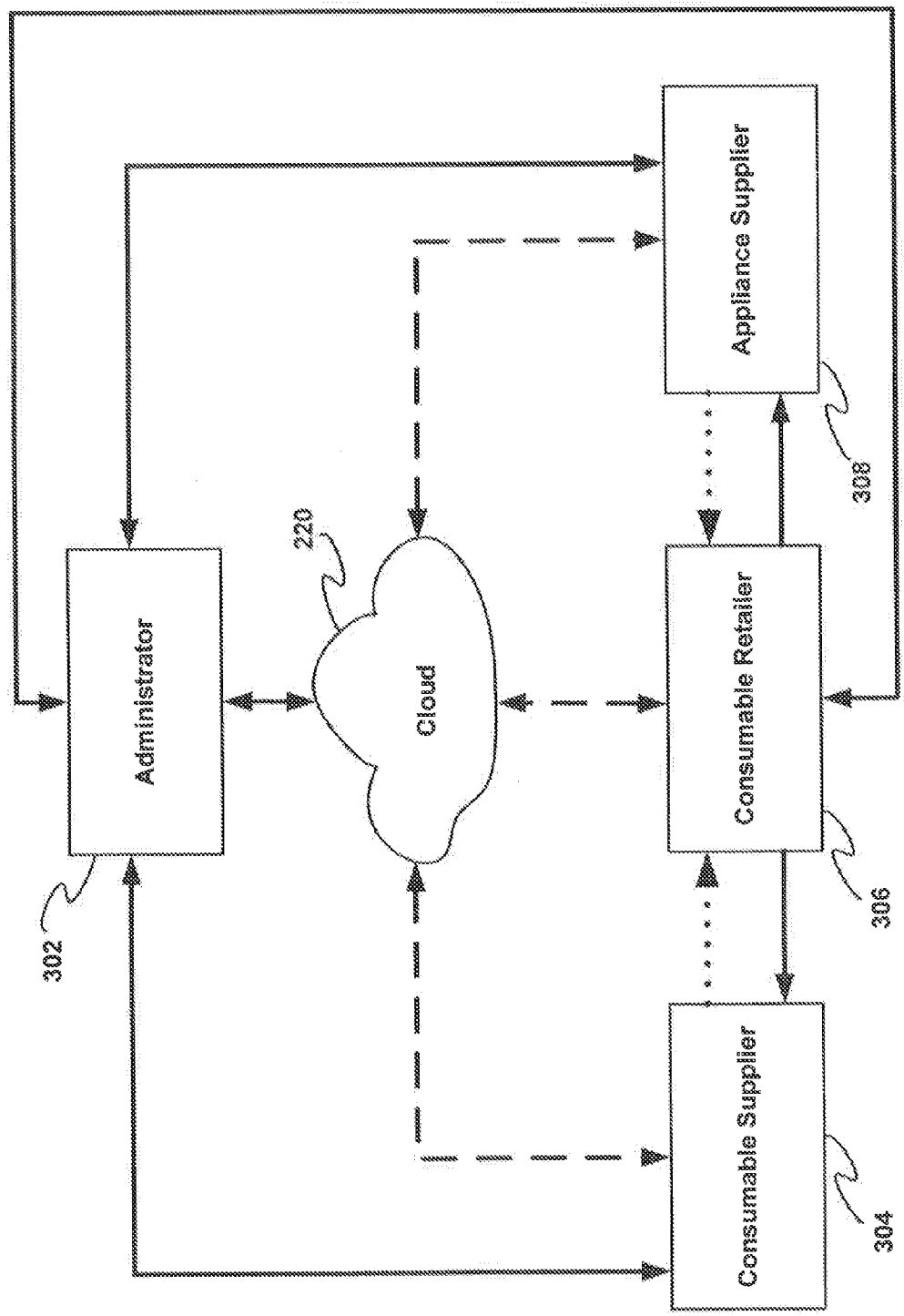
FIG. 3 is a diagrammatic representation of a system for utilizing usage information of consumable products, in accordance with some disclosed embodiments.

FIG. 3 is a diagrammatic representation of a system for utilizing usage information of consumable products, or other information that may be read from machine readable elements associated with the consumable products, in accordance with some disclosed embodiments. In FIG. 3, solid double-headed arrows represent flows of information (e.g., identification information, agreement information, financial information, payment information, etc.) between administrator 302 and other entities depicted in FIG. 3. Dashed-line double-headed arrows represent flows of information (e.g., identification information, agreement information, financial information, payment information, etc.) between cloud 220 and each of consumable supplier 304, consumable retailer 306, and appliance supplier 308. Dotted single-headed arrows represent flows of physical assets, such as products, tags, and processing apparatuses. Solid single-headed arrows represent flows of payments, such as payments for products, tags, processing apparatuses. In FIG. 3, appliance supplier 308 is representative of an entity that manufactures and/or distributes appliances, such as apparatus 100. Consumable products supplier 304 is representative of an entity that supplies consumable products, such as consumable product 102. In some embodiments, consumable products supplier 304 may include a manufacturer of consumable product 102 that produces consumable product 102. In other embodiments, consumable products supplier 304 may include a supplier that purchases consumable products 102 from a manufacturer and distributes the products to consumable retailer 306. Consumable products retailer 306 is representative of an entity that retails consumable products 102. For example, consumable products retailer 306 may include restaurants, hotels, etc. In some embodiments, consumable products retailer 306 may also include a private user or end user who processes consumable product 102 using apparatus 100 (e.g., at home, office, etc.)

In some embodiments, appliance supplier 308 may sell or lease one or more appliances (e.g., apparatus 100) to consumable retailer 306 and may receive a payment from consumable retailer 306 in return, in some embodiments, the appliances may include home appliance, e.g., cooking ovens for residential users. In some embodiments, the appliances may include commercial appliances, e.g., cooking ovens for restaurants, hotels, etc. In some embodiments, the appliances may include industrial appliances, e.g., industrial ovens and/or food manufacturing machines. Where the appliance is sold to consumable products retailer 306, consumable products retailer 306 may pay appliance supplier 308 in full to cover the cost of the consumable, or may establish an installment payment plan with appliance supplier 308, either directly or through a third party (e.g., a financial institution). When the appliance is leased to consumable products retailer 306, consumable products retailer 306 may setup a payment plan and pay leasing fees to appliance supplier 308 in a periodic manner (e.g., weekly, bi-weekly, monthly, etc.).

Consumable products supplier 304 may produce consumable products, e.g., food products and/or may supply the consumable products to consumable products retailer 306. The consumable products supplied by consumable products supplier 304 may include machine readable elements, e.g., tags, that can be read by the appliances (e.g., apparatus 100) manufactured by appliance supplier 308 and sold/leased to consumable products retailer 306. Consumable products retailer 306 may pay consumable supplier 304 for the cost of the consumable products either directly or indirectly.

In FIG. 3, administrator 302 may include an entity that manages and/or operates certain aspects of cloud 220 and interacts with at least one of consumable products supplier 304, consumable products retailer 306, and/or appliance supplier 308. In some embodiments, administrator 302 may be the same as, be owned by, or work for appliance supplier 308. Cloud 220 may contain information regarding consumable products supplier 304, consumable products retailer 306, and appliance supplier 308. For example, cloud 220 may contain records of all participating entities capable of interchanging information with cloud 220, in some embodiments, cloud 220 may contain information relating to the identity of appliance supplier 308, consumable products retailer 306, and/or consumable products supplier 304 (e.g., name, address, contact information, etc.). In some embodiments, cloud 220 may contain financial information of participating entities, such as banking accounts, credit card numbers, etc.

In some embodiments, cloud 220 may contain records of apparatuses manufactured by appliance supplier 308. Cloud 220 may also contain records of apparatuses sold/leased to consumable products retailer 306. The records may include identity information, such as a serial number associated with an apparatus. The records may also include information relating to the appliance supplier (e.g., the manufacturer). In some cases, information relating to the appliance supplier may be included in or can be derived from identity information. The records may also include information relating to users of the apparatus (e.g., consumable products retailers). In some embodiments, cloud 220 may include financial information associated with the apparatus. For example, information about whether the apparatus was sold or leased to a consumable products retailer, information about a periodic payment plan (e.g., when an installment is due, when the payment schedule was established, etc.), information about leasing fees, information relating to remaining balances due, etc. Such information may be uploaded by appliance supplier 308 to cloud 220 directly. Alternatively, appliance supplier 308 may indirectly provide information to cloud 220. For example, in some embodiments, appliance supplier 308 may submit information to administrator 302, and administrator 302 may then input the information into cloud 220.

In some embodiments, cloud 220 may contain information relating to consumable products supplied by consumable products supplier 304. For example, in some embodiments, consumable products may be provided with tags, and cloud 220 may contain records of a portion or all of information included on the tags. In some embodiments, each tag associated with a consumable product may include information relating to the identity of the consumable supplier, identity of the consumable product (e.g., specific ID, bar code identifier, RFID identifier, etc.), type/category of the consumable product, mass/weight of the consumable product, processing (e.g., cooking, heating, thawing, etc.) instructions, price, expiration date, etc. Any or all of this information that may be included on the tag may also be contained by cloud 220.

Information relating to consumable products may be transferred from consumable supplier 304 directly to cloud 220. For example, after consumable products are packaged and associated with tags, consumable product information may be sent to cloud 220 based on information on the tags. Alternatively, consumable products supplier 304 may provide consumable information to cloud 220 in advance, even before consumable products corresponding to such information are produced. In some embodiments, consumable product information may be sent to cloud 220 by administrator 302, rather than consumable products supplier 304.

In some embodiments, cloud 220 may contain information relating to consumable products retailer 306. The information may include identity information of consumable products retailer 306 (e.g., name, address, contact information, cloud service login information, password, etc.), financial information of consumable products retailer 306 (e.g., bank account information, credit card information, payment plan information, balance due, monthly fees, etc.), information about apparatuses manufactured by appliance supplier 308 and sold/leased to consumable products retailer 306, information about consumable products supplied by consumable products supplier 304 and processed by consumable products retailer 306 using the apparatus, etc. When consumable retailer 306 obtains one or more apparatuses (e.g., apparatus 100) manufactured by appliance supplier 308, and uses the apparatuses to process one or more consumable products supplied by consumable products supplier 304, the information relating to consumable products retailer 306 may be transferred to cloud 220 through communication interface 210 of an apparatus 100.

Administrator 302 may manage or interact with consumable supplier 304. For example, in some embodiments, administrator 302 may provide machine readable elements (e.g., tags) to consumable products supplier 304. The tags may be preprogrammed with identity information of the consumable products supplier 304. After consumable products supplier 304 receives the tags, additional information may be programmed, such as information about particular consumable products (e.g., consumable product IDs), processing instructions, etc. Alternatively, administrator 302 may allocate a series of identifiers to consumable products supplier 304. The identifiers may be used for identifying, for example, the consumable supplier 304. Consumable products supplier 304 may then produce tags using the allocated identifiers and associate the tags with consumable products. In this case, it may not be necessary for consumable products supplier 304 to register every tag in cloud 220. Rather, administrator 302 may inform cloud 220 about the allocated identifiers so that cloud 220 may identify consumable products (e.g., through tags) supplied by consumable products supplier 304.

Administrator 302 can manage or interact with appliance supplier 308. For example, in some embodiments, administrator 302 may provide one or more of controller 200, processor 202, or software product for proper operation of apparatus 100 to appliance supplier 308. In some embodiments, administrator 302 may license technology required for manufacturing apparatus 100 to appliance supplier 308. Administrator 302 may record identification information associated with apparatuses manufactured by appliance supplier 308 in cloud 220. For example, administrator 302 may record predetermined apparatus identification information in cloud 220 and then assign the identification information to appliance supplier 308. Alternatively, administrator 302 may collect apparatus identification information from appliance supplier 308 and record the identification information in cloud 220.

Administrator 302 may manage or interact with consumable retailer 306. For example, in some embodiments, administrator 302 may provide infrastructure, devices, and/or information to consumable products retailer 306 so that consumable products retailer 306 may connect to cloud 220. For example, cloud 220 may include a web service interface and may be accessed via Internet. In this case, administrator 302 may provide access information (e.g., username/password or other login information) to consumable products retailer 306. In another example, cloud 220 may only be accessed via special devices. In this case, administrator 302 may provide necessary devices or even infrastructure to consumable products retailer 306.

In some embodiments, consumable products supplier 304, consumable products retailer 306, and appliance supplier 308 may subscribe to services provided by administrator 302. For example, these entities may establish access to cloud 220 by submitting subscription requests (e.g., applications) to administrator 302. Administrator 302 may approve or deny subscription requests depending on certain criteria. After approving a subscription request, administrator 302 may determine whether to grant full or limited access to services of cloud 220, and the access can be free of charge or associated with fees such as subscription fees, usage fees, etc.

Administrator 302 may utilize usage information associated with one or more consumable products to implement a payment/reward scheme to promote processing of the consumable products by the apparatuses. Usage information may include, for example, identity information indicative of an identity of the supplier of a consumable product. In some embodiments, the identity information may include the identity of the supplier of the consumable product. In other embodiments, the identity information may include an identity of the consumable product, which may be associated with the supplier of the consumable product. Usage information may also include identification information of an apparatus used to process the consumable product, such as a serial number of the apparatus. Usage information may also include user information associated with a user (e.g., consumable products retailer 306) of an apparatus used to process the consumable product. In some embodiments, the user may include a retailer of the consumable product (e.g., restaurant, hotel, etc.). In other embodiments, the user may include private user and/or home user. Usage information may indicate that the consumable product is going to be processed, being processed, or has been processed by an apparatus. For example, a customer visiting consumable products retailer 306 (e.g., a restaurant) may choose to consume (e.g., eat) a consumable product supplied by consumable products supplier 304. The consumable product may have a tag associated therewith. Before, during, or after the consumable product is processed (e.g., cooked) an apparatus (e.g., apparatus 100) manufactured or otherwise provided by appliance supplier 308 may read information from the tag (e.g., using reader 106) and may transfer that information to cloud 220. The information read from the tag may include, for example, identity information of the consumable product, and/or identity information of the supplier of the consumable product (e.g., identity of consumable products supplier 304). Cloud 220 may also receive from the apparatus identity information associated with the user of the apparatus used to process the consumable product (e.g., identity information of consumable products retailer 306). Such information may be obtained from the apparatus (e.g., through registration information associated with the apparatus or identification information of the apparatus) and received, for example, together with a reading of a tag. For example, apparatus 100 may transfer to cloud 220 information read from the tag about the product with which the tag is associated and information pertaining to the apparatus, for example, via communication interface 210. After receiving the information, cloud 220 may determine that the consumable product was supplied by consumable products supplier 304 and may notify consumable products supplier 304 that the consumable product is consumed by end users (e.g., customers), e.g., the consumable product is used or processed. In some embodiments, cloud 220 may store records of apparatus identification information (e.g., serial number) associated with apparatus 100 in a database. After receiving usage information, cloud 220 may determine if the usage information is associated with any apparatus in the database based on the stored records. Cloud 220 may apply a debit to supplier 304 based on the received usage information and the stored records of apparatus identification information. For example, when cloud 220 receives usage information indicating that one or more consumable products have been processed (e.g., through readings of tags associated with the consumable products) by an apparatus located in a consumable retailer that may be physically remote from cloud 220, cloud 220 may determine if the apparatus located in the consumable retailer is on record in the database based on a search of apparatus identification information. Cloud 220 may also retrieve identity information from the received usage information to determine one or more suppliers of the consumable products. In some embodiments, the identity information may include an identity of the consumable supplier. In other embodiments, the identity information may include an identity of the consumable product, and cloud 220 may determine the supplier of the consumable product based on the identity of the consumable product, for example, through a search of information associating the consumable product and its supplier. Cloud 220 may determine an amount of money to be collected from the consumable products supplier. Cloud 220 may then apply a debit to the supplier of the consumable product. The debit may be in the amount charged for selling, using, and/or processing one or more consumable products supplied by the consumable supplier using an apparatus of record. In some embodiments, cloud 220 may issue a debit to the consumable supplier's account associated with cloud 220. In some embodiments, cloud 220 may withdraw an amount from a consumable supplier's account associated with a third party (e.g., a financial institute). In some embodiments, consumable supplier may pay the debit directly through cloud 220.

In some embodiments, cloud 220 may determine the number of consumable products processed by consumable products retailer 306. In some embodiments, an apparatus capable of reading tags (e.g., equipped with a tag reader 106) or an associated processor may track the number of readings of tags associated with consumable products and report the number to cloud 220. Based on the number of readings, which may indicate the number of consumable products going to be, being, and/or have been processed by the apparatus, administrator 302 may debit consumable supplier 304 a debit by an amount based on the number of readings. Alternatively or additionally, consumable products supplier 304 may issue usage-based payments to administrator 302. Administrator 302 may, in turn, issue usage-based rewards to consumable retailer 306 by applying a credit to consumable products retailer 306. The credit may be in the form of account credit, check, cash, etc. In some embodiments, the credit may be based on the number of consumable products processed using the apparatus. For example, the credit may be proportional to the number of consumable products processed using the apparatus or may be in accordance with any agreements between consumable retailer 306 and, for example, administrator 302, appliance supplier 308, consumable supplier 304, and/or other entities. In some embodiments, if consumable retailer 306 leases the apparatus from appliance supplier 308, the usage-based rewards may be applied in a form of reduced leasing fees (e.g., a subsidy of leasing fees). In this case, administrator 302 may issue rewards to appliance supplier 308 to compensate for the reduced leasing fees. In some embodiments, administrator 302 and/or cloud 220 may calculate leasing fees based on the number of consumable products processed using the apparatus. For example, the leasing fees may be proportional, or inversely proportional to the number of consumable products processed using the apparatus. The relationship between the leasing fees and the number of processed consumable products may also be in accordance with any agreements between consumable retailer 306 and, for example, administrator 302, appliance supplier 308, consumable supplier 304, and/or other entities. Administrator 302 and/or cloud 220 may also collect the leasing fees from consumable retailer 306 for using the apparatus to process consumable products.

In some embodiments, administrator 302 or appliance supplier 308 may provide (e.g., lease for a fee or give for free) one or more apparatuses to consumable products retailer 306. In return for leasing an apparatus or receiving an apparatus for free from appliance supplier 308, consumable products retailer 306 may be required to purchase or use (e.g., process) a minimum number of tagged consumable products. The imposed requirement may be structured as a one-time purchase or a periodic purchase. For example, the requirement may include a one-time purchase of a certain amount of tagged consumable products, followed by periodic purchases of other amounts of the same or different consumable products.

In some embodiments, various types of consumable products may be counted and reported separately. Based on this information, consumable products supplier 304 may be charged according to numbers associated with specific types of consumable products acquired. For example, consumable products supplier 304 may provide meatball packs and steak packs to consumable products retailer 306. An apparatus and/or an associated processor may count the numbers of processed meatball packs and steak packs separately and separately report that information to cloud 220. Payment from consumable supplier 304 may be collected, e.g., via cloud 220 or directly by administrator 302, based on the number of processed meatball packs and steak packs. In some embodiments, consumable products retailer 306 may process consumable products supplied by different consumable suppliers and receive rewards for processing the consumable products. For example, consumable products retailer 306 may process meatball brand A supplied by consumable supplier A and meatball brand B supplied by consumable supplier B. In some embodiments, consumable products retailer 306 may receive different rewards for processing meatball brand A and meatball brand B. It is noted that cloud 220 may collect different payments from consumable products suppliers A and B and pass on different amounts to consumable products retailer 306. The amounts passed on may be related to (e.g., proportional to) the amounts collected, but it is not necessarily so. Cloud 220 or administrator 302 may determine the debits to the consumable suppliers and the credits to the consumable retailers in any manner consistent with the agreements they may have with consumable products suppliers and/or retailers and with the apparatus providers. In other embodiments, consumable products retailer 306 may receive the same rewards (e.g., for processing meatballs regardless of brands). In some embodiments, rewards for processing different kinds of consumable products can be different. For example, rewards for processing steak may be higher than processing meatballs, for reasons that, for example, steak has a higher retail price than meatball, selling steak has a higher margin than selling meatball, cloud 220 receives higher payment from consumable supplier for processing steak than processing meatball, steak is overstocked and needs to be sold quickly, etc. In some embodiments, cloud 220 may also be operated by appliance supplier 308 or any entities associated with it.

In some embodiments, usage-based rebates/rewards may be implemented as a service on cloud 220, and administrator 302 may be transparent to consumable products supplier 304, consumable products retailer 306, and/or appliance supplier 308. For example, cloud 220 may include a subscription or registration interface, through which appliance supplier 308, consumable products retailer 306, or consumable products supplier 304 may register to the service. Appliance supplier 308 may obtain licenses for using hardware and/or software to make apparatuses that are compatible with the service. Consumable products supplier 304 may obtain tags or identifier information that can be associated with consumable products. Consumable products retailer 306 may obtain access permission to cloud 220 for apparatuses purchased/leased from appliance supplier 308. Consumable products retailer 306 may also obtain information about consumable products supplier 304 and other consumable suppliers that supply tagged consumable products compatible with the service. In some embodiments, fees may be charged for the usage-based incentives service provided by cloud 220. Further, cloud 220 may include online transaction and/or billing models to handle online payment and/or billing. It is noted that in the description throughout the disclosure, the term "tag" is used as an example of "machine-readable element." As explained above, machine-readable elements may include forms other than tags.

In some embodiments, cloud 220 may perform part of or all functionalities of administrator 302. For example, administrator 302 may be partially or entirely integrated into cloud 220. In this case, cloud 220 may manage or interact with appliance supplier 308, consumable products supplier 304, and/or consumable products retailer 306 on behalf of administrator 302. Therefore, cloud 220 and administrator 302 can be a single entity. As used herein, when cloud 220 is described to perform a function or provide a service, it should be understood that that function or service may be performed or provided under the direction of administrator 302, which may be integrated into, and therefore may be transparent or invisible to a user of cloud 220 (e.g., appliance supplier 308, consumable products supplier 304, consumable products retailer 306, etc.).

Because of the usage-based incentives, consumable products retailer 306 may be motivated to process tagged consumable products. Consumable products supplier 304, although paying out rebates, may benefit from the service as well due to high sales driven by consumable products retailer 306. Appliance supplier 308 may also benefit because the incentives effectively lower the cost of apparatuses (e.g., lowering leasing fees), making the apparatuses more affordable and, therefore, enhancing competition.

Figure 4:
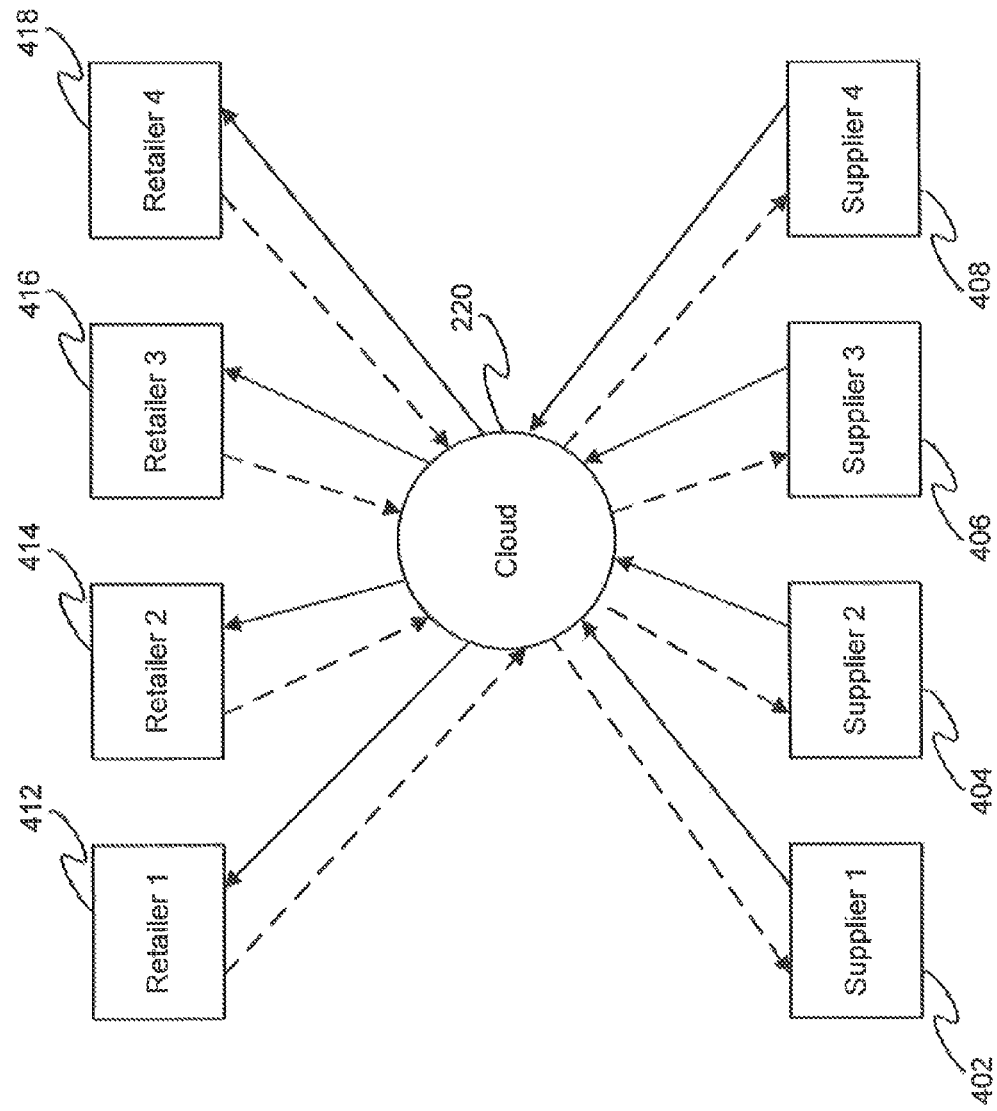
FIG. 4 is a diagrammatic representation of an exemplary system for utilizing usage information of consumable products, in accordance with another embodiment.

FIG. 4 is a diagrammatic representation of an exemplary system for distributing payments for consumable products and processing thereof, in accordance with some embodiments. Compared with FIG. 3, FIG. 4 shows multiple consumable product retailers (412, 414, 416, and 418) and multiple consumable product suppliers (402, 404, 406, and 408). Each retailer may purchase consumable products from one or more suppliers. Similarly, each supplier may sell consumable products to one or more retailers. These connections between supplier and retailers may change over time, and cloud 220 may or may not be aware of the connections and/or the changes. Cloud 220, however, may be aware of usage of tagged consumable products through information gathered by apparatuses, because information on such usages may be provided to cloud 220, e.g., from the retailers' apparatuses (dashed arrows from retailers to cloud 220).

Cloud 220 may analyze the information received from the various retailers. For example, cloud 220 may classify usage information according to suppliers and calculate total usage data, e.g., the total number of usage of consumable products, the total price of consumable products, etc., for each supplier. In some embodiments, the total usage data may be further classified according to different types of consumable products. The analyzed information may be transferred to suppliers, as indicated by the dashed arrows from cloud 220 to suppliers 402-408. Based on the analysis, cloud 220 may charge each supplier based on the total usage data determined for that supplier. Suppliers may transfer payments to cloud 220, as indicated by the solid arrows from suppliers 402-408 to cloud 220.

Cloud 220 may further analyze the information received from retailers to determine incentives to which each retailer may be entitled. This analysis may be based on terms of use agreed upon between cloud 220 and different retailers. For example, retailer 1 (412) may agree to receive a flat rate reward of 0.5 dollar per usage, regardless of the price of the processed consumable product or the supplier of the consumable product. In another example, retailer 2 (414) may agree to receive a reward based on a flat rate percentage of the sale price of the consumable products. Retailer 3 (416) may receive a base reward if the total usage below a threshold number, and receive bonus rewards when the total usage exceeds the threshold number. Retailer 4 (418) may receive a reward based on different suppliers and/or different consumable products. These are just a few examples of many different ways of receiving incentives based on usage data. Accordingly, cloud 220 may credit each retailer, as indicated by the solid lines from cloud 220 to retailers 412-418, based on any reward-based methodology.

Cloud 220 may collect information from retailers, analyze the information, and selectively distribute the analyzed information among suppliers. On the other hand, cloud 220 may collect money from suppliers and distribute the money (or a portion thereof) among retailers. In some embodiments, only part of the money collected from suppliers may be distributed among retailers. In some embodiments, a portion of the collected funds may be distributed, for example, to appliance supplier 308 and/or administrator 302.

Figure 5:
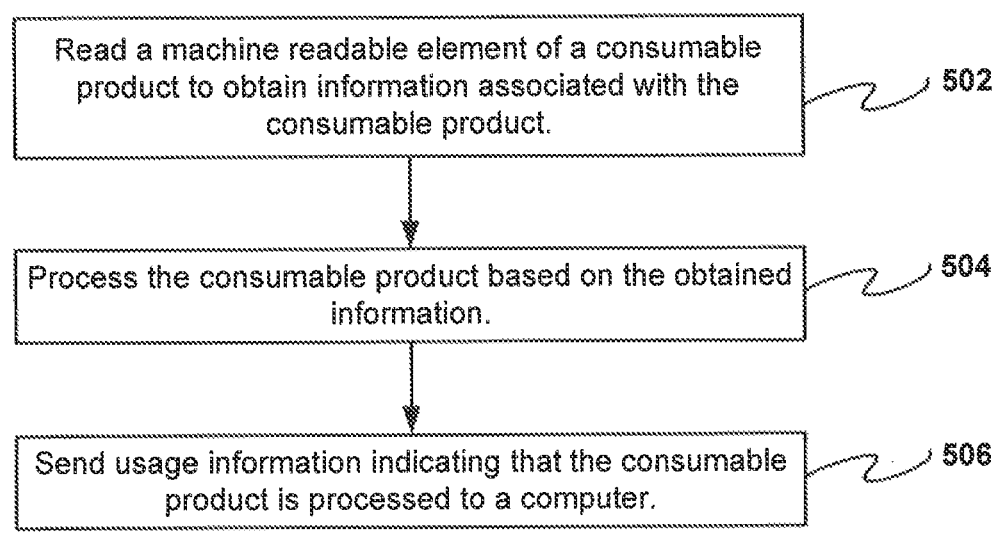
FIG. 5 provides an exemplary flow chart of a method for processing consumable products using an exemplary apparatus, in accordance with some disclosed embodiments.

Some embodiments of the invention may include a method for processing a tagged consumable product using an apparatus. Such a method may be accomplished, for example, through at least one processor implementing a series of steps of process 500, as set forth in the flow chart of FIG. 5.

In step 502, a machine readable element (e.g., tag 104) of a consumable product (e.g., 102) may be read (e.g., by reader 106) to obtain information associated with the consumable product. For example, processor 202 may receive from reader 106 information associated with consumable product 102, such as information about the supplier (e.g., consumable products supplier 304) of consumable product 102. In some embodiments, processor 202 may control reader 106 to read machine readable element 104 to obtain information associated with consumable product 102. In addition, the information may include type, mass, price, processing instructions, etc. Consumable product 102 may be processed automatically or partially automatically based on the processing instructions. For example, processor 202 may read processing instructions and control apparatus 100 to process consumable product 102 according to the processing instructions without any user intervention. Alternatively, a user may input certain information, such as flavor preference, desired doneness, etc, before or during processing of consumable product 102 by apparatus 100.

In step 504, the consumable product may be processed by an apparatus (e.g., apparatus 100) based on the obtained information. In some embodiments, consumable product 102 may be processed by the apparatus according to instructions provided by a user, e.g., through control panel 122. For example, processor 202 may control one or more energy application elements to process consumable product 102. In some embodiments, processor 202 may obtain processing instructions directly from information obtained by reading machine readable element 104. Additionally or alternatively, processor 202 may determine the identity of consumable product 102 from information obtained by reading machine readable element 104, and then obtain or determine processing instructions by, for example, consulting a look up table, accessing a memory, downloading from a remote server, etc.

In step 506, usage information may be sent to cloud 220 through, for example, communication interface 210. As used herein, usage information may include information regarding usage of apparatus 100 (e.g., apparatus 100 may be used to read one or more machine readable elements 104 and/or process one or more consumable products 102) and/or information regarding one or more consumable products 102 that are processed by apparatus 100 (e.g., resulting from the usage of apparatus 100). In some embodiments, usage information may include identification information of apparatus 100 (e.g., serial number, product code, MAC address, etc.). In some embodiments, usage information may include identification information (e.g., serial number, supplier name, product code, etc.) of one or more consumable products 102 processed by apparatus 100. In other embodiments, usage information may include a total number of processed consumable product(s). The total number may refer to the total number of all consumable products processed by apparatus 100, regardless of differences in type, price, mass, supplier, etc. In some embodiments, when the consumable products are supplied by a plurality of suppliers, the total number may be in a vector form and include an array of numbers each corresponding to the number of consumable products supplied by one supplier. Additionally or alternatively, the total number may include one or more subtotal numbers that are calculated based on at least one aspect of type, price, mass, consumable supplier, manufacturer, etc.

Some embodiments of the invention may include a method for processing a consumable product (e.g., a tagged product or a food item) having a machine readable element. The method may involve processing the consumable product using a specified apparatus (e.g., an oven). In an exemplary embodiment, the method may be used for promoting the cooking of tagged food items with ovens equipped with tag readers.

Figure 6:
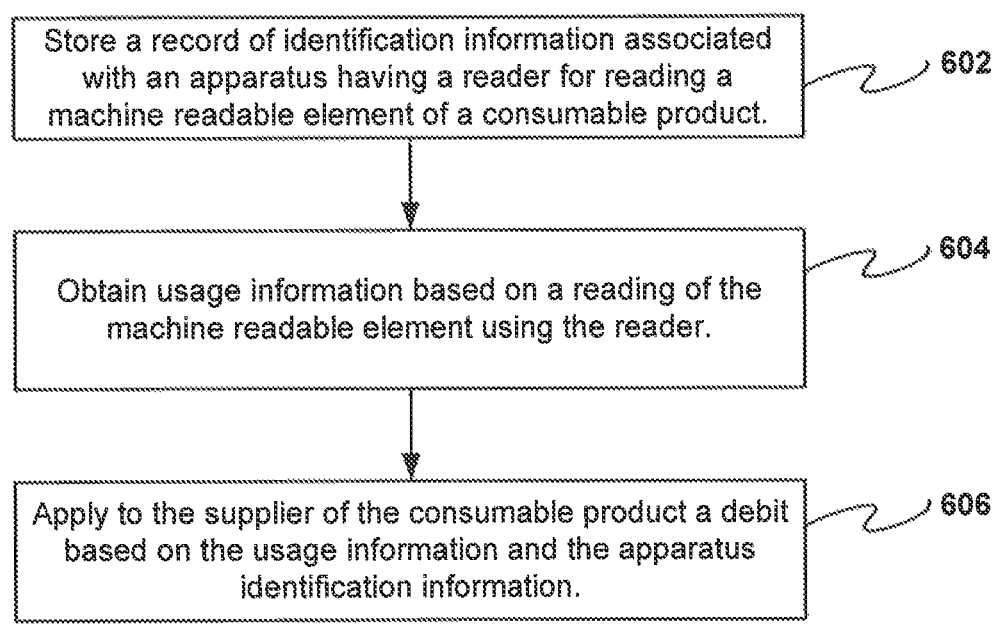
FIG. 6 provides an exemplary flow chart of a method for utilizing usage information of consumable products, in accordance with some disclosed embodiments.

FIG. 6 shows a flow chart of an exemplary method 600 for utilizing a reading of a machine readable element associated with a consumable product, in accordance with some embodiments of the invention. In step 602, a record may be stored in cloud 220. The record may include identification information (e.g., serial number, product code, MAC address, etc.) of an apparatus (e.g., apparatus 100) having a reader (e.g., 106) for reading a machine readable element (e.g., 104) of a consumable product (e.g., 102).

In step 604, cloud 220 may obtain usage information indicating that the consumable product is going to be processed, is processed, or has been processed by an apparatus, whose identification information has been recorded in cloud 220, e.g., apparatus 100. As discussed above, such usage information may include information regarding usage of apparatus 100 and/or information that consumable product 102 is going to be processed, is processed, or has been processed by apparatus 100. For example, usage information may include identification information of apparatus 100 (e.g., serial number, product code, MAC address, etc.). In another example, usage information may include identification information (e.g., serial number, supplier name, product code, etc.) of consumable product 102 processed by apparatus 100. In some embodiments, instead of receiving identification information of individual processed consumable products, cloud 220 may receive the number of total processed consumable products(s). As discussed above, the total number may refer to the total number of all consumable products processed by apparatus 100, regardless of differences in type, price, mass, etc. Alternatively, the total number (e.g., in a vector form) may include one or more subtotal numbers that are calculated based on at least one aspect of type, price, mass, etc. In some embodiments, the consumable product may include or otherwise be associated with a machine readable element, and the usage information may be obtained based on a reading of the machine readable element using the reader of the apparatus. The machine readable element may include, for example, one or more RFID tags readable using a radio frequency sensor, graphic indicators (e.g., barcodes) readable using an optical sensor, and/or magnetic indicators readable using a magnetic sensor. In some embodiments, the consumable product may include food items, and the apparatus may include an oven for cooking the food items. For example, each food item may carry a barcode that identifies the food item, and each barcode may be read prior to being cooked or even during the cooking process in the oven, or after cooking.

In step 606, cloud 220 may apply a debit to the supplier of the consumable product (e.g., consumable supplier 304) based on the usage information and the apparatus identification information. In some embodiment, the received usage information may be compared with the stored record of identification information of the apparatus. For example, when the received usage information includes identification information of apparatus 100, such identification information can be compared with records stored in cloud 220 to determine that the apparatus that sent usage information is on the record. Cloud 220 may determine that a particular consumable product or a specific number of consumable products have been processed by a particular apparatus. In some embodiments, cloud 220 may contain information regarding the supplier of the apparatus, e.g., regarding appliance supplier 308. In some embodiments, cloud 220 may contain information regarding the user of the apparatus, e.g., regarding consumable retailer 306. In another example, when the received usage information includes identification information of the consumable product, cloud 220 may determine that a particular consumable product or a specific number of consumable products supplied by a particular consumable supplier (e.g., consumable supplier 304) have been processed by apparatus 100. Cloud 220 may calculate an amount for debiting the supplier of the consumable product (e.g., consumable supplier products 304) for the consumable product processed using apparatus 100, in some embodiments, the amount of debit may be calculated based on usage information. For example, when the usage information includes identity of consumable product 102, cloud 220 may determine the supplier of consumable product by looking up a database associating the consumable product and its supplier. Cloud 220 may also determine the amount of debit based on, for example, the type, price, weight of the consumable product, information in an agreement with the supplier of the consumable product, etc. Cloud 220 may then apply a debit to the account of consumable products supplier 304 for processing the consumable product using apparatus 100.

In some embodiments, the debit can be calculated based on the total number of processed consumable product(s). For example, a fixed amount method may be used. In this method, every processed consumable product may qualify for a fixed amount of payment, regardless of the differences in type, price, mass, quality, origin (e.g., regardless of the supplier/manufacture of the consumable product), etc. In another example, a flexible amount method can be used. In this method, rebate/payment debit to the supplier can be different based on any aspect of the consumable product, such as type, price, mass, quality, supplier, brand, etc. In addition, a bonus rebate/debit can be applied if a certain condition is met, such as exceeding a threshold number of processed consumable products, exceeding a threshold number of processed consumable products within a predetermined time period, etc.

Rewards can be issued to, for example, consumable products retailer 306, to promote sales of consumable products. The rewards may be applied as credits to the account of consumable products retailer 306. When consumable products retailer 306 leases the apparatus from appliance supplier 308, cloud 220 may reduce leasing fees for which consumable retailer is responsible by applying credits to appliance supplier 308 as rewards to consumable products retailer 306. In some embodiments, rewards to consumable retailer 306 and/or appliance supplier 308 may be based on at least a portion of payment that cloud 220 collects from consumable supplier 304 (e.g., by debiting consumable products supplier 304 an amount of the payment).

In some embodiments, consumable products retailer 306 may be provided with apparatus 100 produced or distributed by appliance supplier 308 to process consumable products based on an agreement to purchase and/or process an agreed amount of consumable products supplied by one or more consumable suppliers. For example, apparatus 100 may be provided to consumable products retailer 306 free of charge or with a reduced fee under the condition that consumable products retailer 306 would purchase and/or process in apparatus 100 an agreed amount of consumable products from one or more consumable suppliers (e.g., suppliers 402-408), one time and/or periodically. In this way, consumable retailers may be encouraged to obtain and use apparatus 100 from appliance supplier 308 due to low or no initial cost coupled with usage based incentives.

In some embodiments, the machine readable element associated with the consumable product may include one or more codes and/or ID numbers. The code and/or identification number may be read automatically from the machine readable element. Additionally or alternatively, the code and/or ID number may be human-readable, and may be input manually by a user via a user interface.

In some embodiments, information stored on a machine-readable element (e.g., tag 104) may be encrypted. Processor 202 may decrypt the information obtained by reader 106 after the encrypted information stored on tag 104 has been read by reader 106.

In some embodiments, cloud 220 may determine if there is double- or multiple-use of tags. For example, a single tag associated with a consumable product may be read twice or more times by an apparatus and usage information associated with the particular consumable product may be received by cloud 220 more than once. In this case, cloud 220 may inform administrator 302 and/or consumable products supplier 304 about the multiple-use of the tag. Administrator 302 and/or consumable supplier 304 may determine proper actions (e.g., apply fines, etc.).

In the foregoing Description of Exemplary Embodiments, various features are grouped together in a single embodiment for purposes of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Description of the Exemplary Embodiments, with each claim standing on its own as a separate embodiment of the invention.

Moreover, it will be apparent to those skilled in the art from consideration of the specification and practice of the present disclosure that various modifications and variations can be made to the disclosed systems and methods without departing from the scope of the invention, as claimed. Thus, it is intended that the specification and examples be considered as exemplary only, with a true scope of the present disclosure being indicated by the following claims and their equivalents.

The invention claimed is:

1. A computer system for utilizing a reading of a machine readable element associated with a consumable product, the computer system comprising:
   a memory including computer executable instructions; and
   a processor having access to the memory for executing the computer executable instructions, wherein execution of the computer executable instructions by the processor causes the processor to perform operations including:
      storing a record of apparatus identification information associated with an apparatus, the apparatus being configured to process the consumable product and having a reader or reading the machine readable element;
      obtaining usage information relative to the consumable product based on a reading of the machine readable element by the reader, wherein the usage information comprises identity information indicative of an identity of a supplier of the consumable product; and
      applying a debit to the supplier of the consumable product based on the usage information and the apparatus identification information, the debit indicating an amount of money to be collected from the supplier of the consumable product.

2. The computer system of claim 1, wherein the usage information includes user information associated with a user of the apparatus, and the operations further comprise:
   applying a credit to the user of the apparatus based on the usage information.

3. The computer system of claim 2, wherein the user of the apparatus is a retailer of the consumable product.

4. The computer system of claim 2, wherein the operations further comprise:
   calculating a fee to be collected from the user of the apparatus for using the apparatus to process the consumable product, wherein the fee is based on a number of consumable products processed using the apparatus.

5. The computer system of claim 4, wherein the credit is applied as a reduction of the fee.

6. The computer system of claim 2, wherein the credit is based on a number of consumable products processed using the apparatus.

7. The computer system of claim 1, wherein the usage information includes user information associated with a user of the apparatus, and the operations further comprise:
   applying a credit to the user of the apparatus based on the debit and the usage information.

8. The computer system of claim 1, wherein the usage information indicates that:
   the consumable product is to be processed by the apparatus;
   the consumable product is being processed by the apparatus; or
   the consumable product has been processed by the apparatus.

9. The computer system of claim 1, wherein the identity information includes at least one of:
   an identity of the consumable product; or
   the identity of the supplier of the consumable product.

10. The computer system of claim 1, wherein the apparatus includes an oven and the consumable product includes a food product.

11. The computer system of claim 1, wherein obtaining the usage information comprises:
   obtaining the usage information associated with a plurality of consumable products based on a total number of readings of machine readable elements corresponding to the plurality of consumable products.

12. The computer system of claim 1, wherein the machine readable element includes at least one of: an RFID tag readable using a radio frequency sensor, a graphic indicator readable using an optical sensor, or a magnetic indicator readable using a magnetic sensor.

* * * * *